United States Patent [19]

Buchholz et al.

[11] Patent Number: 4,740,893
[45] Date of Patent: Apr. 26, 1988

[54] METHOD FOR REDUCING THE TIME FOR SWITCHING BETWEEN PROGRAMS

[75] Inventors: Werner Buchholz; Ronald M. Smith, both of Wappingers Falls, N.Y.

[73] Assignee: International Business Machines Corp., Armonk, N.Y.

[21] Appl. No.: 763,167

[22] Filed: Aug. 7, 1985

[51] Int. Cl.[4] .......................... G06F 13/00; G11C 8/00
[52] U.S. Cl. ...................................... 364/200; 364/736
[58] Field of Search ... 364/200 MS File, 900 MS File, 364/730, 736

[56] References Cited

U.S. PATENT DOCUMENTS 4,385,365 5/1983 Hashimoto .......................... 364/900
4,525,796 6/1985 Omoda et al. ...................... 364/200

FOREIGN PATENT DOCUMENTS 131284 1/1985 European Pat. Off. .
1405334 9/1975 United Kingdom ................ 364/200

OTHER PUBLICATIONS

Introduction to Microprocessors: Software, Hardware Programing, by Leventhal, (1978) pp. 56-61, 90-115, 433-493.

Primary Examiner—Gary V. Harkcom
Assistant Examiner—Lawrence E. Anderson
Attorney, Agent, or Firm—Joseph A. Biela

[57] ABSTRACT

The invention relates to vector registers (VRs) which have associated therewith a vector status register (VSR) that includes VR status information in the form of vector in-use and change bits for saving and restoring (the contents of) the VRs. When the vector in-use bit for a VR is zero, the saving and subsequent restoring of the VR is eliminated because the VR is known to contain all zeros. This reduces program switching time. The vector change bit for a VR serves to reduce switching time still further by permitting the saving of a VR to be eliminated when its vector in-use bit is one but the vector change bit is zero. Although such a VR is in use, its content has not been changed since the last restore from the same save area in storage. The previously saved information is still valid. The vector change bits do not affect the restoring of vector registers and, therefore, do not reduce the restore time.

1 Claim, 6 Drawing Sheets

VSR

METHOD FOR REDUCING THE TIME FOR SWITCHING BETWEEN PROGRAMS

BACKGROUND OF THE INVENTION

1. Field of the Invention

This invention relates to the saving, restoring and clearing of registers used for the processing of vectors by one program when switching occurs to another program. More particularly, this invention relates to the selective saving and restoring of vector registers in order to reduce the time for switching between programs.

2. Prior Art

Vector processing is discussed in a book by P. M. Kogge entitled "Architecture of Pipelined Computers", published by McGraw-Hill and Hemisphere Publishers, 1981.

IBM Technical Disclosure Bulletin, Vol. 24, No. 8, January 1982, pages 4431–4432, entitled "Status Save/Restore/Modify of a Unit of Work" by L. C. Hitch discloses the status save/restore/modify services which permit a unit of work to signal the saving and restoring of its own status. The unit of work may request the saving of its current status and then process other work that it has. At a later time it may request that the previously saved status be restored.

IBM System/370 Principles of Operation manual, GA22-7000-8, No. S370-01, broadly discusses interruptions with respect to scalar quantities.

Generally, in the prior art, programs using vector instructions are allowed to run for long periods of time or until they are completed in order to minimize the overhead (time) involved in switching between programs. Switching between programs will only be permitted to occur when a vector instruction has completed. In this case, vector instructions are not interrupted.

It is an object of this invention to reduce the time, i.e. the overhead, for switching between programs when switching occurs during the execution of an interruptible vector instruction or before a program containing the instruction has ended.

It is an object of this invention to save and restore only vector registers that are in use.

It is a further object of this invention to distinguish between in-use vector registers that were simply restored and in-use vector registers that were restored and subsequently changed.

It is another object of this invention to save only in-use vector registers, whose contents were changed, and which were previously restored from the same area in memory.

Another object of this invention is to utilize save and restore instructions that are interruptible.

SUMMARY OF THE INVENTION

A data processing system is disclosed and claimed that includes a memory, at least one central processing unit which has special registers, an instruction element and an execution element, for executing programs in which at least one program has instructions that operate on at least one of said special registers. The data processing system further includes a register in which a bit, corresponding to a special register is set, indicating that a special register is in-use, when one of the instructions is received and interpreted in the instruction element, and a gate that permits the execution of a different one of the instructions when both the bit in the register is set and the different one of the instructions is received and interpreted by the instruction element.

DESCRIPTION OF THE PREFERRED EMBODIMENT

Hardware

Figure 1:
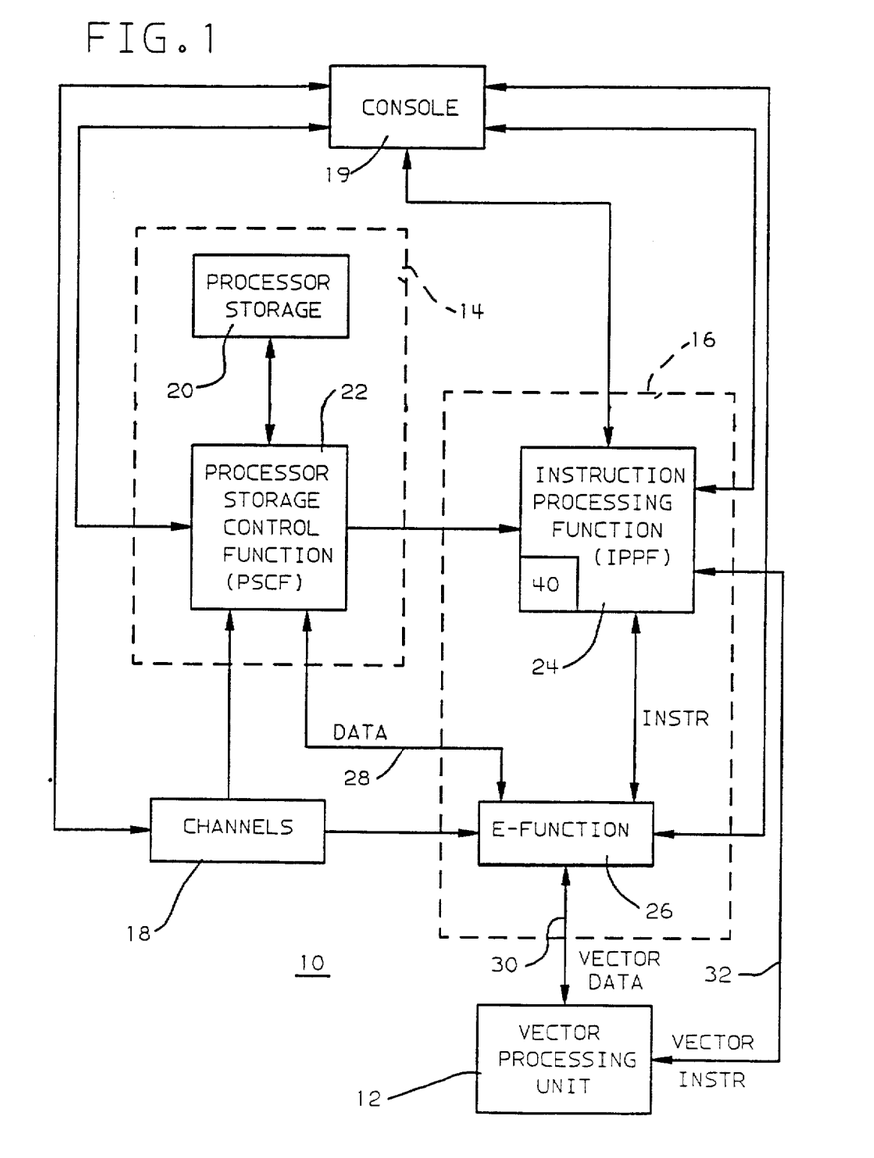
FIG. 1 is a block diagram of a data processing system which includes a vector processing unit.

FIG. 1 is a block diagram of data processing system 10 including a vector processing unit (VPU) 12. With the exception of VPU 12, the remainder of FIG. 1 represents a "base" data processing system which includes memory 14, central processing unit (CPU) 16 (operating, for example, in the IBM System 370-XA mode), console 19 and channels 18. The console is used by the system operator for interacting with the various control, e.g. initialization, programs.

Memory 14 includes processor storage 20 and processor storage control function (PSCF) 22. The memory is utilized for the storage of program instructions and data operands including vector operands to be processed by VPU 12. The PSCF obtains sequences of instructions from memory 14 and initiates the transfer of data operands to CPU 16.

CPU 16 includes a high speed buffer (not shown), instruction pre-processing function (IPPF) unit 24 for decoding instructions and E-function unit 26 for executing instructions transferred to it from the IPPF. These units as well as the base data processing system are more fully described in U.S. Pat. No. 4,200,927 which is assigned to the assignee of the present invention and incorporated herein by reference. IPPF 24 fetches and decodes all instructions including those executed by E-function unit 26 and those executed by VPU 12. In particular, fetch (and store) of vector operands is initiated by microcode and the IPPF, while execution of vector instructions is controlled by the VPU. As described in the above-cited patents, E-function unit 26 is connected to memory 14 via data bus 28 for executing non-vector processing instructions, and includes a microprogram control store for generating instruction execution control signals. Results of instruction executions in E-function unit 26 are communicated back to IPPF 24 which, in response, controls the sequence of instruction execution.

The VPU extends functions of the IPPF and E-function unit. Interconnection of VPU 12 with the base data processing system is by means of interface bus 30 between VPU 12 and E-function unit 26, and interface bus 32 between VPU 12 and IPPF 24. Vector data operands are fetched from the high speed buffer through the E-function unit to the VPU as required by the vector operations.

Interface bus 32 transfers vector instruction operation codes (op codes) from a queue in IPPF 24 to a vector instruction register (not shown) and a vector instruction buffer (not shown) in the VPU. The bidirection al interface bus 32 is also utilized to transfer address information between ALU putaway register (not shown) and general purpose stride register 40. All of these registers and buffers are shown and more fully described in co-pending patent application serial No. 745,040 having common assignee herewith.

The vector instruction buffer retains the vector instruction op code and vector register addresses received on interface bus 32 for use by decode circuits in VPU 12 during instruction execution.

The transfer of data between VPU 12 and memory 14 is provided along a data bus. Specifically, data from memory 14 is provided on data bus 28 through E-function unit 26 to a data register (not shown) in VPU 12 via bidirectional interface bus 30. The data register serves as a buffer for data transmitted to it from E-function unit 26 via interface bus 30. Data transferred from VPU 12 to memory 14 is provided from a stage A register (not shown) in VPU 12 to a register in E-function 26 via interface bus 30.

Figure 2:
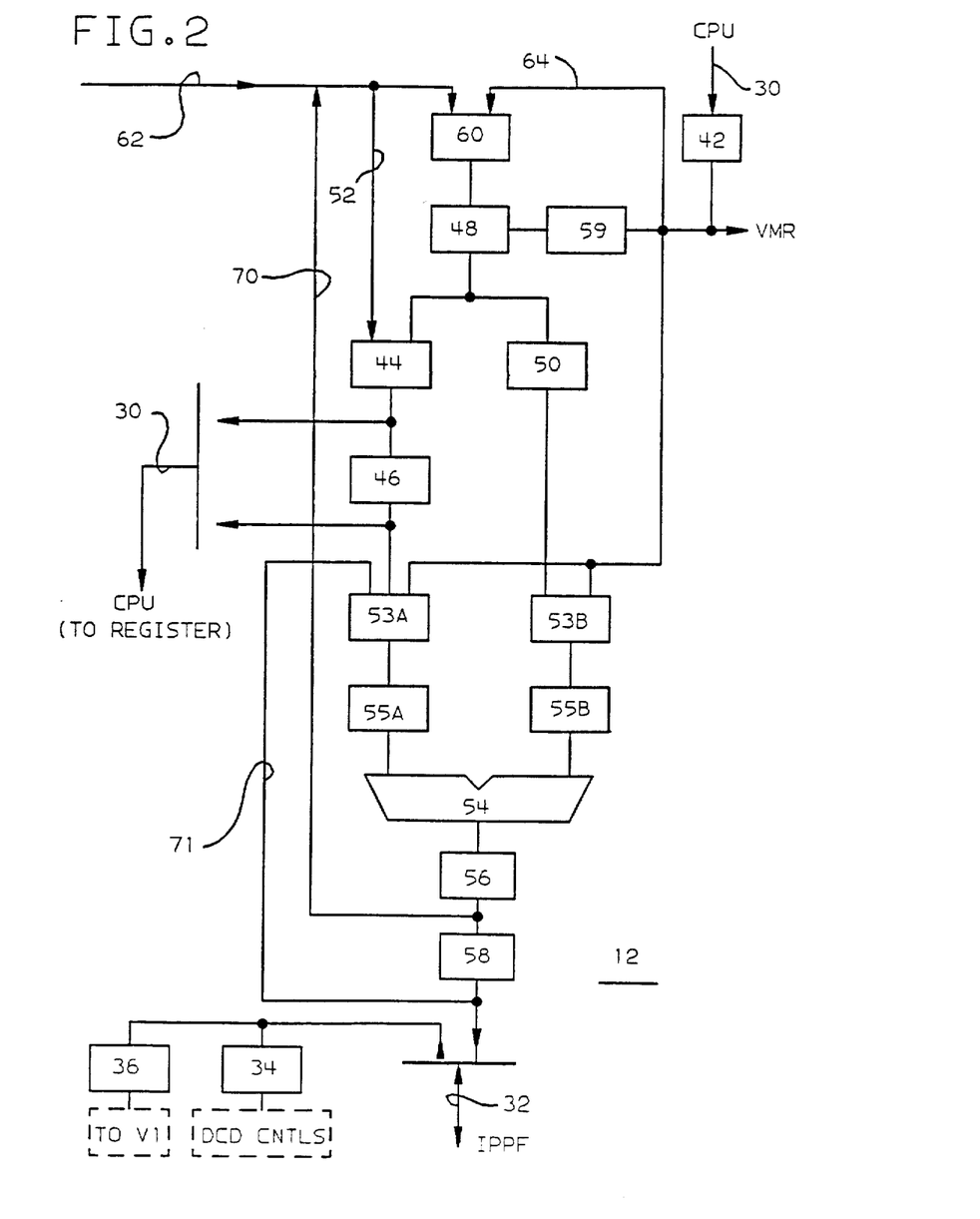
FIG. 2 is a block diagram of the hardware paths, registers and functional units of the vector processing unit of FIG. 1.

FIG. 2 shows paths, registers and functional units of VPU 12 several of which were discussed above. FIG. 2 also includes an array of vector registers (VRA) 48 which is shown in more detail in FIG. 3.

Figure 3:
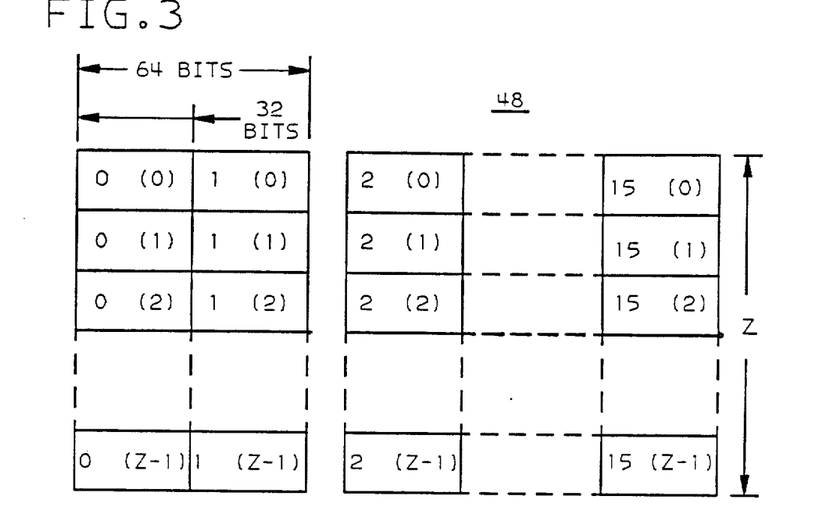
FIG. 3 is a block diagram representing the vector registers in the vector processing unit of FIG. 1.

In particular, FIG. 3 shows sixteen physical vector registers, forming a vector register array in VPU 12, numbered (ordered) from 0 through 15 each having Z element locations numbered from 0 through Z-1 where Z is a number, e.g. 128, fixed in a particular data processing system. Unlike general purpose registers and floating-point registers, the vector registers are multi-purpose in that vectors of both binary (arithmetic or logical) and floating-point data can be stored therein. The vector registers are used to hold one or more vector operands for arithmetic, comparison, logical, load and store operations. Depending on the operation, a vector may occupy a single vector register having Z elements each 32 bits wide or an even-odd pair of registers (vector register pairs) if the physical registers, in which corresponding elements are combined, form double word (64 bit) operands. Vector registers include vector mask registers as well as vector registers that contain vector operands, i.e. vector data registers.

Referring to FIG. 2, vector operands (data) read from the vector register array are transmitted to stage A register 44 and stage B register 50. (Stage A register 44 also accepts data transmitted from a vector mask register (VMR) on line 52. A vector mask register (having Z bits) is used as the target of the result of vector-compare operations, source and target of logical operations on bit vectors, and source of the mask for masked controlled operations.) Data from the stage A register is transmitted to E-function unit 26 via interface 30. Lambda register 46 receives the data in the Stage A register and is used as a data delay register as well as a back-up register for data transmitted to E-function unit 26 from stage A register 44. The data delay is necessary to provide for proper access to vector register array 48. Data, which is properly shifted and aligned for floating point operations (via ALU shift registers 53A and 53B and ALU input registers 55A and 55B, is then transmitted to arithmetic logic unit (ALU) 54 for processing. The ALU (arithmetic means) is a parallel binary adder which performs addition and subtraction on binary, short precision and long precision vector operands. The ALU can also perform logical AND, OR and EXOR operations, and can logically shift an operand left 1, 2, or 3 bits. ALU register 56 maintains the output of ALU 54. ALU putaway register 58 serves as a delay register for data transmitted from ALU register 56 that is to be recycled to the ALU via line 71. Data that is to be written back to VRA 48 is gated to VRA putaway 60 via data bus 70. ALU putaway register 58 and line 71 are used for instructions that require vector data to be "wrapped around" through the ALU pipe. An example of such an instruction would be an instruction used to accumulate a vector into a scalar result. The result from the ALU is wrapped back into register 53A to be summed with another element within that vector. A partial result of the accumulation is written into VRA 48 (via VRA putaway register 60) during each machine cycle. (The ALU putaway register and VRA putaway receive normalized logic input as a result of floating point operations.)

Vector instruction buffer 36 retains the vector instruction op code and vector register addresses received on interface bus 32 for use by other decode circuits in VP 12 during instruction execution.

As shown in FIG. 2, operand data is obtained from either vector register array 48 or CPU 16 through data register 42. When two operands are provided by the vector register array, the first vector element fetched is provided to stage A register 44 and is subsequently manipulated by arithmetic or logical instructions in ALU 54 and thereafter transmitted to ALU putaway register 58 and VRA putaway register 60 (A-side data path). The second vector element fetched is provided to stage B register 50 and is subsequently manipulated by arithmetic or logical instructions in ALU 54 and thereafter transmitted through to ALU putaway register 58 and VRA putaway register 60 (B-side data path). Specifically, the first element of the operand on the A-side data path is read out of vector register array 48 one machine cycle earlier than the first element of the operand on the B-side data path. Thus, after two cycles, the first element on the A-side operand is in lambda register 46, the first element of the B-side operand is in stage B register 50, and the second element of the A-side operand is in stage A register 44. This initial offset of the elements in the A-side and B-side data paths accommodates the input/output (I/O) interface chip of the vector register array. The offset guarantees that only "one" read is made from any array chip during any given cycle. Therefore, a vector, i.e. the result of a vector operation, in VRA putaway register 60 is stored in vector register array 48 during each machine cycle. (In summary, element operand pairs are manipulated in the ALU pipe with the results subsequently being written into VRA 48 during each machine cycle. Using this "pipeline" feature, element operations are performed such that results from any operation are written into the VRA each cycle. VPU 12 also includes a multiply-divide unit and associated registers (not shown) which are connected to the A-side and B-side data paths and which are described in the references cited herein.)

When an operation is to be performed on one vector operand from memory 14 (FIG. 1), together with one vector operand from a vector register in vector register array 48, the vector operand from the array is transmitted through stage B register 50 and the B-side data path. The vector operand from memory 14 (through E-function unit 26) is first transmitted to data register 42 and then through the B-side data path. The vector result of the operation is written into a destination vector register in vector register array 48. When an operation is to be performed using a vector operand and a scalar operand, the scalar operand is first transmitted to data register 42 and then to ALU register 53A where the operand remains for the duration of an instruction. ("Operation" includes taking data from storage as well as loading and storing data and results in storage. "Results" include the outcome of arithmetic and logical operations on the contents of vector registers and vector mask registers as well as the loading of vector registers and vector mask registers. Results may be stored in scalar or vector registers as well as in storage. Vector elements loaded in vector registers can be returned to storage.)

When a sequence of vector elements of a vector operand are to be transferred from memory 14 to VPU 12, the data transfer path for a vector load instruction begins at a register in CPU 16 and continues through interface bus 30 to the data register in VPU 12. The elements are then stored in (written into) a vector register in the vector register array. Each time an element is written into a vector register, the hardware increments the vector element address in the general purpose address registers by the number of bytes in an element, i.e. 2, 4 or 8. CPU 16 calculates the storage address of each vector element fetched, and transfer data to the calculated element location at a maximum rate of one element for each cycle. The E-function unit, under microcode control, generates the address of the first vector element and passes this value to the IPPF. The IPPF fetches successive vector elements by incrementing the addresses for each new fetch.

During vector store instructions, VPU 12 transfers data from a vector register (in which it was loaded) in the vector register array through the stage A register and onto bidirectional interface bus 30 to CPU 16.

VPU 12 provides for operations on vectors of short and long floating point numbers and of binary integers. There are also operations on vectors of individual bits, which are generally used as mask bits. Operations are performed on operands in storage, in a vector register (or a pair of vector registers) or in a scalar (general or floating point) register or some combination thereof. That is, operations can be performed between a vector in storage and a vector register operand or between two vector register operands. One source operand can be a scalar while the other source operand can be a vector. The scalar can be treated as a vector having the same number of elements as the vector operand thereby giving a vector result, or a scalar result can be obtained. Instructions which use mask bits generally designate an implicit operand in the vector mask register. They also may designate storage and vector register operands.

A discussion of VPU 12 in data processing system 10 is also found in co-pending U.S. patent application Ser. No. 544,674 which is now abandoned.

Vector Status Register (VSR)

The vector status register (VSR), maintained in the E-function unit, contains fields of information which describe the current status of the vector (and the vector mask) registers. The contents of the VSR as a whole is examined by a SAVE VSR instruction and altered by a RESTORE VSR instruction. For most instructions, the VSR is read at the beginning of the instruction and transmitted to a register in VPU 12 (vector hardware), via bi-directional bus 30, for later manipulation. When the VSR is changed, its value is gated through a shifter in VPU 12 and written back into an array in CPU 16.

Figure 4:
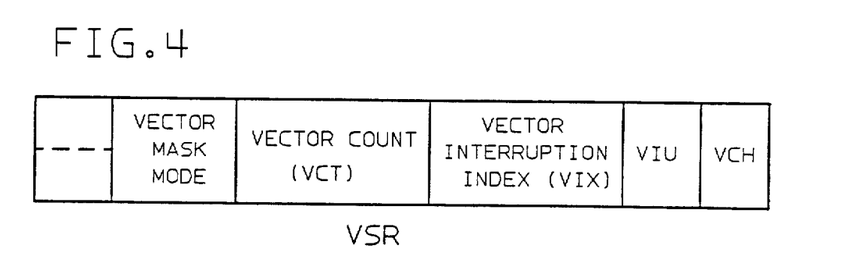
FIG. 4 is a schematic representation of the fields of the vector status register of the vector processing unit of FIG. 1, FIGS. 5a–d are block diagrams showing the restoring or saving of registers depending upon the settings in the fields of the vector status register of FIG. 4, and FIGS. 6a–b are schematic representations showing from where vector instructions are fetched, how execution of those instructions is controlled and where the instructions are executed.

In particular, the VSR, as shown in FIG. 4, includes vector in-use (VIU) bits and vector change (VCH) bits. In this embodiment, the VIU field (first register means) in the VSR has eight bits. Each of the eight bits is associated with a physical vector register pair. The VIU bits indicate which vector register pairs are to be saved and restored by the SAVE VR and RESTORE VR instructions. During execution of instructions which use the vector registers, the VIU bit associated with a vector register pair is set to one whenever any element in either or both of the registers is loaded or modified. (The VIU is set, as specified by the operand of an instruction, by a setting means. The setting means, in this case, is microcode. Also, in this embodiment, the VCH field (second register means) in the VSR has eight bits. Each of the eight bits is associated with a physical vector register pair. The VCH bits indicate which vector register pairs are to be saved by the SAVE CHANGED VR instruction. During execution of the instructions (other than RESTORE VR) which use the vector registers, the VCH bit associated with a vector register pair is set to one whenever any element in either or both of the registers is loaded or modified. (The VCH is set, as specified by the operand of an instruction, by the above mentioned setting means. In this case, the setting means is also microcode.) As indicated above, at the end of an instruction, the (changed) contents of the VSR, to include the VIU and VCH fields, are written back into an array in the CPU. The VPU is used to examine the VIU and VCH bits.

Definitions

Machine check: a type of interruption which indicates an equipment malfunction, but not a programming error.

Privileged instruction: an instruction that is valid only when the CPU is in the supervisor state.

Supervisor state: when program status word (PSW) bit 15 is zero, the CPU is in the supervisor state in which all instructions are valid.

Problem state: when PSW bit 15 is one, the CPU is in the problem state. Only those instructions are valid that provide meaningful information to the "problem". (The "problem" is an application program that cannot affect system integrity. The operating system insures that problem programs are run only in the problem state.)

Unprivileged instruction: an instruction that is valid in either problem or supervisor state. (An unprivileged instruction will not set PSW bit 15.)

Vector Interruptions

General interruption action is known in the art and includes storing the PSW as an old PSW, storing information identifying the cause of the interruption, and fetching a new PSW. Further processing is specified by the instructions at the address in the new PSW. One of the functions performed by the instructions at the address in the new PSW is the saving of the registers used for vector processing.

All vector instructions which can operate on multiple elements of arithmetic vectors in storage or in vector registers can be interrupted (between elements) as the vector instruction operates on any element position when exceptional conditions are detected. The exceptional conditions may be for external causes such as input/output actions, or for causes internal to the current program being executed by the CPU. For example, a privileged-operation exceptional condition is recognized, which causes a program interruption, when a privileged instruction is issued while the CPU (or VPU) is in the problem state. Internal causes include storage access exceptions such as page faults and arithmetic exceptions such as unnormalized operand, exponent overflow and underflow and divide by zero. If an instruction is interrupted before completing all of the vector elements which it is to process, the address of the instruction in the old PSW is not updated to point to the next instruction to be executed.

When an exception is encountered causing an interrupt to occur, a vector interruption index (VIX) points to the appropriate vector register location containing the next element to be processed after the interrupt ends. The general purpose registers which contain the address for a vector element in storage will be updated to contain (point to) the address of the next vector element in storage to be processed when the instruction is resumed.

Vector instructions are (or appear to be) executed sequentially, elements of the vector operands of a single vector instruction are (or appear to be) processed sequentially, and any resulting exceptions are (or appear to be) recognized sequentially. If execution is not sequential, and some operations are overlapped for greater performance, the hardware retains enough information to be able to restore all registers to the precise point of interruption, the same as if operation had been purely sequential. Any program interruption is due to the first exception which is recognized and for which interruptions are allowed. Changes to storage locations or register contents, which are to be made by an interrupted vector instruction (or by subsequent vector instructions) after the interruption has ended, will not have been made at the time of the interruption.

When the interruption processing has been completed by the new program so that it is possible to resume the interrupted program, the previously saved registers must be restored to their previous contents. Then, the instruction that was interrupted is re-issued (since the instruction address in the old PSW has not advanced to the next instruction and the old PSW is reinstated as the current PSW) and the vector execution resumes from the point of the interruption, i.e. the next element to be processed, as indicated by the VIX for vector registers and by a general purpose (address) register for storage. As is known in the art, the instruction address in the current PSW specifies words (halfwords) to be fetched by CPU 16. (Execution, from the point of interruption, is resumed as long as the content of all registers including the VIX are restored since the interrupted vector instruction is merely reissued.) Since the results obtained by prior execution of the interrupted vector instruction had been stored, resumption of execution of the instruction does not disturb the previously obtained results. In fact, there can be multiple interruptions during the execution of a single vector instruction at different element locations and for different reasons without loss of previously obtained results. For vector operations, the precise interrupt requires identification of both the instruction and the element having the exception.

A substantial amount of time is required to save and restore vector registers following a program interrupt, since the storage area for saving vector registers can be thousands of bytes in length, unlike the scalar parts of the data processing system, where saving or restoring the registers involves less than 200 bytes of data. Saving and restoring the registers of the VPU can have a noticeable performance impact. The invention disclosed and claimed herein provides for a substantial reduction in save and restore time by implementing in-use and change bits in conjunction with save, restore and clear instructions. The following description of the invention shows that the saving and restoring of unused vector registers and the saving of unchanged vector registers can be eliminated, thereby improving performance.

Program Switching

When switching from one program to another as a result of an interrupt, registers that are used for the processing of vectors by one program will be saved, restored or, under certain conditions, cleared. Interrupts allow more than one program to share use of the same vector facility. When switching programs, it is necessary to save the contents of the VPU registers used by the recently interrupted program and to restore the previous contents for the program that will be resumed. Registers used by the recently interrupted program, but not used by next program, will be cleared. The restore instructions, when executed, examine and respond to the settings of vector in-use bits and vector change bits which are associated with each pair of vector registers.

The vector in-use bits are eight bits in the VSR (as shown in FIG. 4). They correspond to the eight vector register pairs shown in FIG. 3 and indicate which vector registers (VRs) are to be saved and restored by the SAVE VR and RESTORE VR instructions. These instructions ignore vector register pairs for which the vector in-use bit is zero.

The vector change bits are eight bits in the VSR. They correspond to the eight vector register pairs shown in FIG. 3 and indicate which vector register pairs are to be saved by the privileged SAVE CHANGED VR instruction. This instruction saves a vector register pair if the corresponding change bit is one. The vector change bit is then set to zero. (The vector change bit associated with a vector register pair is also set to zero whenever the corresponding vector in-use bit is set to zero by means of the CLEAR VR or RESTORE VSR instruction.) Vector change bits allow the program to avoid redundant "saves" into the same storage area, as would happen when a program is interrupted multiple times before the contents of a vector register pair are changed.

SAVE VR/SAVE CHANGED VR/SAVE VSR
Examples

FIGS. 5a-d are block diagrams showing the events that can occur when, for programs running in either the problem state or the supervisor state, the content of vector registers and the vector status register are saved.

Figure 5A:
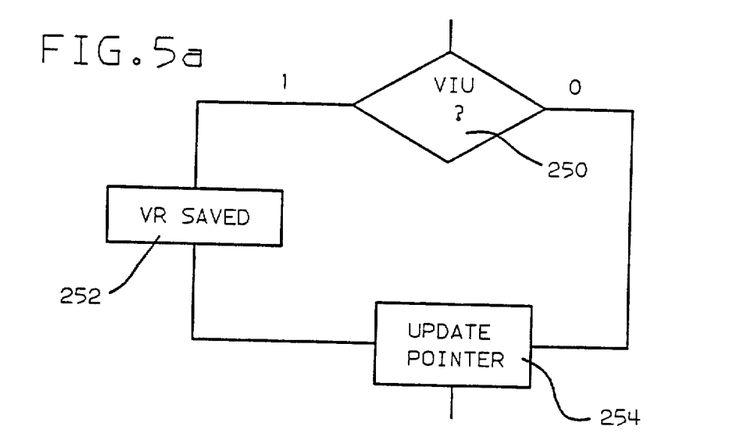
Figure 5B:
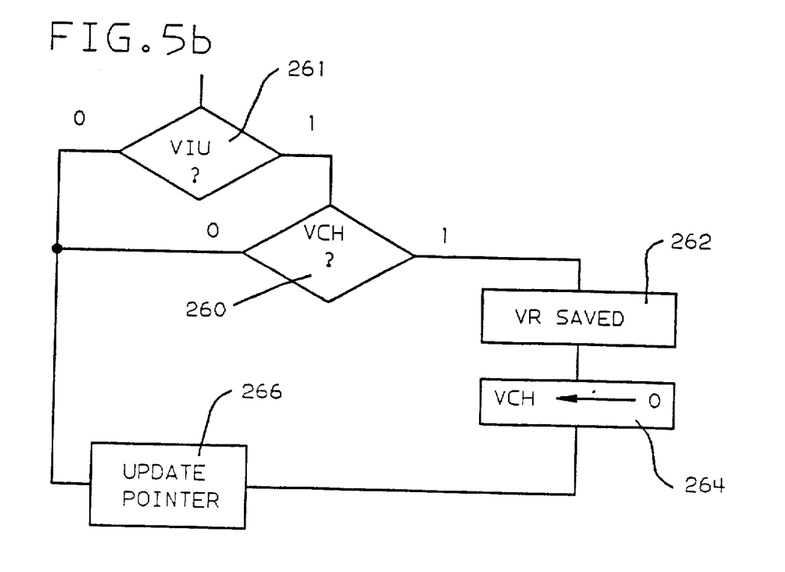

If the vector in-use bit (VIU) is one, as determined at decision block 250 in FIG. 5a, the content of the associated vector register (VR) pair is placed in consecutive double words (block 252) at the designated next-element address in a save area (see below) upon execution of a SAVE VR instruction. If the VIU is zero, the content of the VR pair is not stored in the save area. In either case, the next element address is incremented (updated at block 254) to the save area location of the next VR pair. The (unprivileged) instruction SAVE VR is used when saving a VR pair in a storage area which may or may not be the same as the one from which the VR pair was last restored.

To save the content of vector registers in an area of storage from which they were previously restored, a (privileged) SAVE CHANGED VR instruction may be issued. The SAVE CHANGED VR instruction is only used when the save area location is guaranteed to be the same. When the privileged instruction is issued and the VIU and the vector change bit (VCH) are each set to one, as determined at blocks 261 and 260 in FIG. 5b, the content of the VR pair is placed in consecutive double words of storage at the designated next-element address (block 262) in a save area which should be the save area from which the VR pair was previously restored. The VCH is then reset to zero (block 264). If the vector change bit is already zero, the content of the VR pair is not stored. The VR pair is not stored regardless of whether the VIU is one or zero. In either case, the next-element address is incremented (updated at block 266) to point to the save area location of the next VR pair.

Following the execution of either the SAVE VR or SAVE CHANGED VR instruction, the content of the VSR should then be saved so that the VCH is saved as a zero. The VSR is placed in storage at the double word location designated by an operand in a separate SAVE VSR instruction.

RESTORE VSR/RESTORE VR Examples

Figure 5C:
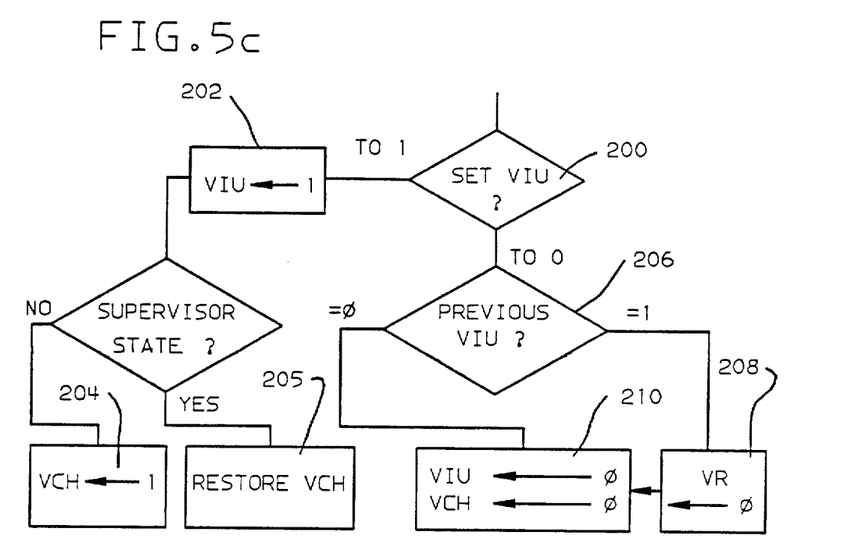

FIG. 5c shows the events that can occur when the RESTORE VSR instruction is issued.

During execution of instructions which use vector registers, the bit VIU associated with a VR pair is set to one whenever any element in either or both of the registers is loaded (for the first time) or modified (after already having been loaded a first time). (The VIU is reset (set to zero) whenever the registers are cleared.)

The VIU is set by a RESTORE VSR instruction. Decision block 200 determines if the VIU is to be set. Actually, the VIU is set as specified by the operand of the instruction.) If the VIU is to be set to one (block 202) while in the problem state, the corresponding vector change bit (VCH) is also set to one (block 204). If the VIU is to be set to one in the supervisor state, the VCH is set as specified in an operand of the instruction. If the VIU is to be reset to zero, the old setting of the VIU is tested (decision block 206) before the VIU is reset; if the previous setting of the VIU was one, all element positions of the vector register pair corresponding to the VIU are cleared to zeros (block 208). Both the VIU and corresponding VCH are then set to zeros (block 210). If the previous setting of the VIU was zero, the vector register pair are not cleared (again), but both the VIU and corresponding VCH are set to zeros (block 210).

Figure 5D:
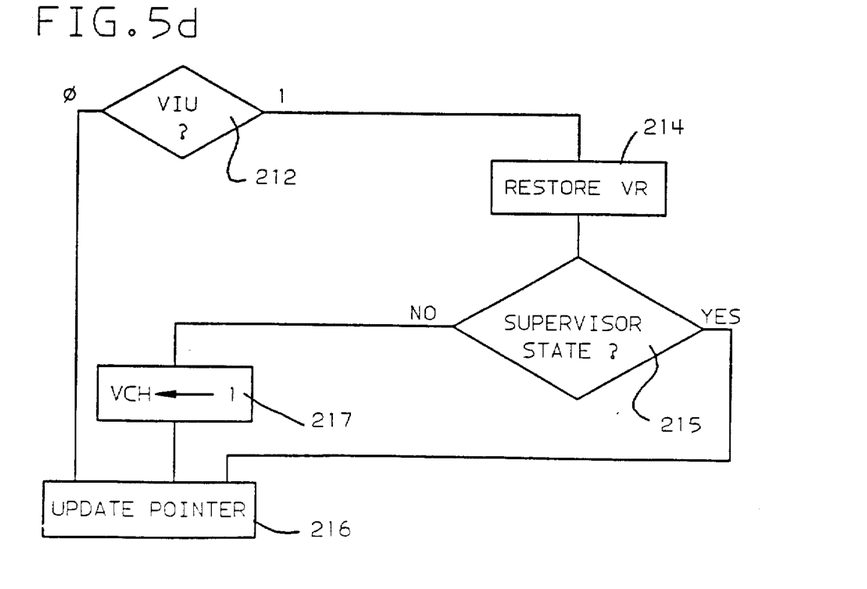

The vector register is restored by a RESTORE VR instruction as shown in FIG. 5d. The VIU must previously have been set by a RESTORE VSR instruction. If the VIU associated with a VR pair is one, as determined by decision block 212, the content of the VR pair is restored (block 214) with its prior content previously saved. (Restoring the VR pair means replacing the content of the VR pair with consecutive double words from the save area at the next-element address. An (even) general register contains the next-element address. An (odd) general register specifies both the next-element number and the vector register pair.) If the CPU is in the problem state (block 215) and VIU is one, then VCH is set to one (block 217) in order to keep application programs from misusing instructions. If the CPU is in the supervisor state and VIU is one, the VCH will remain as it was since the most recent execution of the RESTORE VSR instruction. If the VIU is zero, the content of the VR pair is not restored. The VR pair remains cleared. In any case, the next-element address is incremented (updated at block 216) to the save area location of the next VR pair. For example, if the VR pair 2 or 3 was the one just restored, the (odd) general register would be updated (by two) to point to the VR pair 4 or 5. The next-element address is updated to the save area location of VR pair 4 and 5, i.e. the next address following the end of the save area of vector register pair 2 and 3. The next-element number becomes zero.

Clear Operations

The instruction CLEAR VR is used to clear all or selected pairs of vector registers and to reset the in-use and vector change bits of these register pairs to zero. It may be used initially by the control program (in supervisor state), before permitting the VPU to run a new program (in problem state), to ensure that all vector registers are cleared. It is also issued by the program (in problem state) to clear a vector register pair that it no longer needs to use (or will not use again very soon). In either case, unnecessary saving and restoring of vector registers can then be avoided, because they are identified as not in use.

When a vector register pair has been cleared by the CLEAR VR instruction, and the corresponding vector in-use bit is zero, all elements in those registers contain zeros. The zero elements in a cleared register are valid operands. Such use of a cleared vector register or register pair as a source operand does not set the associated vector in-use bit to one. (One or more individual elements of a cleared vector register pair may be changed (loaded or modified) and, once changed, its vector in-use bit and vector change bit are set to ones. The vector registers are considered to have been changed even if the value loaded is zero.)

Save Operations

Programs running in either the problem state or the supervisor state will use the instruction SAVE VR (in a program loop as described below) to save the entire contents of all vector register pairs for which the vector in-use bits (discussed below) are ones.

Alternatively, when a program using the VPU is interrupted and the vector registers are saved in an area in which they were previously restored, an interruption handler in the supervisor state may use the privileged instruction SAVE CHANGED VR. The SAVE VSR instruction is issued after the vector registers have been saved so that the vector change bits are saved as zeros. (The SAVE CHANGED VR clears the vector change bit after it has saved a changed VR pair.)

The SAVE VR instruction is used (instead of SAVE CHANGED VR) when the vector registers are to be saved in an area which is not necessarily the one in which they were last restored. For example, SAVE VR is the appropriate instruction for a machine-check interruption handler.

Restore Operation

In order to restore the VSR and the vector registers, the instruction RESTORE VSR is issued before the first RESTORE VR is encountered. The RESTORE VSR instruction clears a vector register pair when it finds that the associated vector in-use bit is one and must be set to zero.

When either CLEAR VR or RESTORE VSR finds a vector in-use bit that is already zero, the instruction does not clear the vector register pair again. If either instruction is interrupted and later re-issued, it is re-executed from the beginning. However, no time is wasted on handling registers that were cleared before the interruption and that have remained cleared.

Vector In-Use Bit

During execution of instructions which use the vector registers, the vector in-use bit associated with a vector register pair is set to one whenever any element in either or both of the registers is loaded or modified. When a register is used as the source of an operand, its vector in-use bit remains unchanged.

The vector in-use bits are set by the RESTORE VSR instruction. If that instruction changes a vector in-use bit from one to zero, the corresponding vector register pair is cleared to zeros. The vector register pair is cleared to zero without fetching its (possible previously saved) value from storage 20. A vector in-use bit is also set to zero when the CLEAR VR instruction clears the corresponding vector register pair to zeros.

A primary purpose of the vector in-use bits is to reduce the time for switching between programs. When the vector in-use bit for a vector register pair is zero, no attempt will be made to save or restore the register pair since the register is not being used and it contains zeros anyway.

Vector Change Bits

During execution of instructions which use the vector registers, other than the instruction RESTORE VR, the vector change bit associated with a vector register pair is set to one whenever any element in either or both of the registers is loaded or modified. When a register is used as the source of an operand, its vector change bit remains unchanged. Execution of the RESTORE VR instruction in the supervisor state leaves the vector change bits unchanged. (Execution of RESTORE VR in the problem state sets the vector change bit to one, but program switching is a function of the system control program (SCP) which operates in the supervisor state. The vector change bits are not needed in the problem state.)

The vector change bit is always zero when the vector in-use bit is zero. When the vector change bit is set to one, the vector in-use bit is also set to one.

The vector change bits serve to reduce the switching time still more by eliminating the saving of any vector register pair that is in use, but whose contents have not been changed since it was last restored from the same save area (discussed below) in memory. In other words, the previously restored information in the registers is still valid (unchanged) even though it is still in use, i.e. the change bit is zero and its vector in-use bit is one.

The vector change bits do not affect the restoring of vector registers and, therefore, do not reduce the amount of time that it would take to restore the registers. Restoring the contents of a pair of registers during program switching is not considered a chang and does not alter its vector change bit.

The instructions RESTORE VR, SAVE CHANGED VR and SAVE VR are interruptible and save or restore only a single pair of vector registers each time they are issued. When more than one vector register pair is to be saved or restored, the appropriate instruction must be used in a programming loop as follows:

1. A first general purpose register specified by an instruction points to the beginning of the save area for the vector registers.

2. A second general purpose register, which is initially cleared (set to zeros) contains the next element number and the number of the next vector register pair to be saved or restored.

3. The save or restore instruction is issued.

4. The instruction (in 1 above) is followed by a conditional branch statement which permits branching to occur back to the save or restore instruction, until the last vector register pair has been saved or restored.

As each vector element is saved or restored, the next element number and the save area address (see below) are incremented. When the instruction is completed, the next element number is set to zero, the number of the next vector register pair is incremented, and the save area address points to the save area for the next vector register pair.

If the SAVE or RESTORE instruction is interrupted during execution, resumption of the program causes the instruction to be re-executed for the same vector register pair starting from the vector element at which execution was interrupted.

This program loop causes each vector register pair, in turn, to be saved or restored if its vector in-use bit is one or to be ignored if the bit is zero.

VCH/VIU/Instructions

Figure 6A:
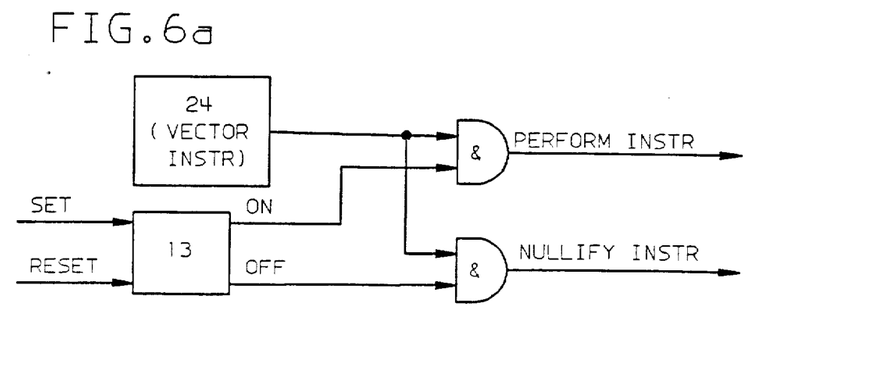
Figure 6B:
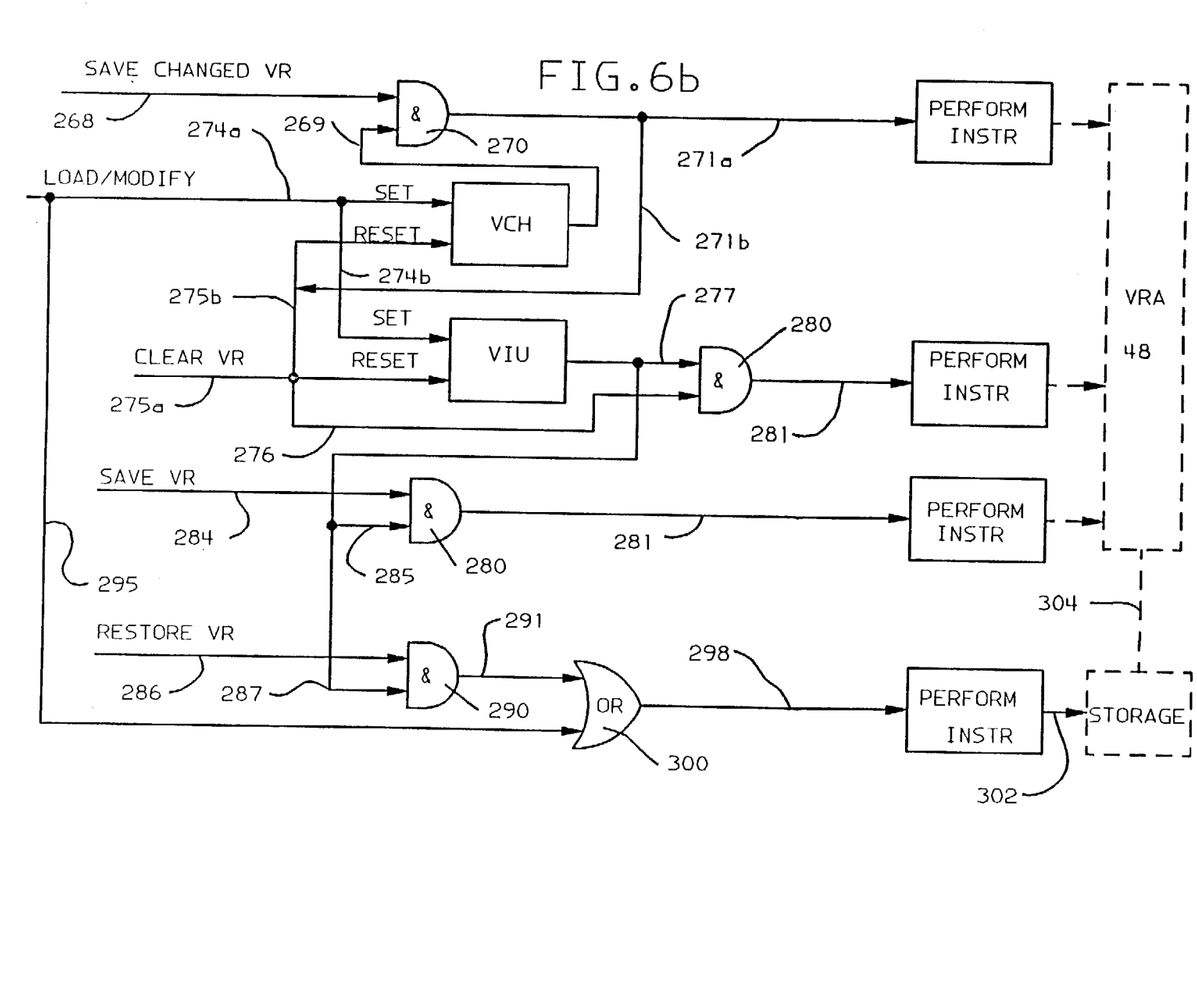

FIGS. 6a-b are schematic representations showing from where vector instructions are fetched, how execution of those instructions are controlled and where the instructions are executed. FIG. 6a shows generally that vector instructions are received (and interpreted by IPPF 24. However, a vector instruction will subsequently be executed in an E-function type unit in VPU 12 or in E-function unit 26 in CPU 16 only if the vector (instruction) control bit 13 is set to one (on). The E-function type unit in VPU 12 is an extension of E-function unit 26 in CPU 16 and is referred to herein as execution element means or means for executing instructions which is under hardware control. The IPPF is referred to herein as instruction element means or means for interpretive instructions and is under microcode control. (The instruction control bit (ICB) is bit 14 of control register 0 in CPU 16. Control register 0 is third register means.) If the control bit is zero (off), a vector operation exception is recognized when an (unsuccessful) attempt is made to execute the vector instruction. The vector operation exception nullifies the operation (prevents the vector instruction from being executed) and the (first) program is interrupted. When the vector operation is nullified, there is no longer a need to save or restore any of the vector register pairs. A privileged instruction (in a second program), which is executed only in the supervisor state, sets (and resets) ICB 14. The ICB is set when VPU 12 is installed on CPU 16 and is available to the user. When the ICB is set, the vector instruction in the first program can be interpreted (again) and executed.

FIG. 6b shows specific vector instructions and the conditions under which they are executed.

When the (privileged) SAVE CHANGED VR instruction is issued and the VCH associated with a specified pair of vector registers is set, then the contents of that vector register pair in VRA 48 are placed in consecutive double words of storage 20 at the designated next element address. In other words, when both the SAVE CHANGED VR instruction has been fetched and decoded (input line 268) and the VCH has been set (input line 269), gating means 270 produces an output signal (on output line 271) that provides (on line 271a) for the SAVE CHANGED VR to be performed in an execution element means such as an extension of E-function unit 26. The output signal from gating means 270 also provides (one line 271b), after a slight delay, for the VCH to be reset to zero. The execution of the instruction causes the contents of a vector register pair in VRA 48, corresponding to the VCH, to be placed in storage 20 via line 304. The VCH is then reset to zero. Of course, if the VCH is zero when the SAVE CHANGED VR instruction is fetched and decoded, no output signal will be provided on output line 271 indicating that the instruction will not be executed and the vector register pair will not be stored. The effect is that a vector register pair is saved only if it has been loaded or modified since the last use of SAVE CHANGED VR designating the pair. (Loading or modifying a vector register pair provides for VCH and VIU, corresponding to that vector register pair, to be set (as indicated by lines 274a and 274b). VCH and VIU are reset (as indicated by lines 275a and 275b) when the CLEAR VR instruction is issued (fetched and decoded). As indicated above, VCH is also reset once the SAVE CHANGED VR instruction is performed.) VIU and VCH are set or reset by microcode (or software) in response to the type of instruction that was received and interpreted by the instruction element means. The instruction element means signals the microcode (or software) to either set or reset the VIU and/or the VCH depending on the type of instruction (load, modify, clear or save a changed VR) that is interpreted by the instruction element means.

When the CLEAR VR instruction is issued the specified pair(s) of vector registers are cleared, the associated vector in-use bits and vector change bits are set to zeros and the VIX is set to zero. Vector register pairs which were previously cleared are not cleared again provided that their vector in-use bits are still zeros. In other words, when both the CLEAR VR instruction has been fetched and decoded (input line 276) by the instruction element means and the VIU has been set (input line 277), gating means 280 produces an output signal (on output line 281) that provides for the CLEAR VR to be performed by the execution element means. The execution of the instruction causes the contents of a vector register pair in VRA 48, corresponding to the VIU, to be cleared with zeros. Of course, if the VIU is zero when the CLEAR VR is issued, no output signal will be provided on output line 281 indicating that the instruction will not be executed and the vector register pair will not be cleared. The effect is that a vector register pair is cleared only if it has been in use.

When the SAVE VR instruction is issued and the VIU associated with a specified pair of registers is set, then the contents of that vector register pair in VRA 48 are placed in consecutive double words in (any area of) storage at the designated next element address. In other words, when both the SAVE VR instruction has been fetched and decoded (input line 284) by the instruction element means and the VIU has been set (input line 285), gating means 290 produces an output signal (on output line 281) that provides for the SAVE VR to be performed by the execution element means. The execution of the instruction causes the contents of a vector register pair in VRA 48, corresponding to the VIU, to be saved in storage 20. Of course, if the VIU is zero when the SAVE VR is fetched and decoded, no output signal will be provided on output line 281 indicating that the instruction will not be executed and the vector register pair will no be saved.

When the RESTORE VR instruction is issued and the VIU associated with a specified pair of vector registers is set, then the contents of that vector register pair are replaced by consecutive double words from a storage area (the save area for the vector register pair) at the next element address. In other words, when both the RESTORE VR instruction has been fetched and decoded (input line 286) and the VIU has been set (input line 287), gating means 290 produces an output signal (on output line 291) that provides for the RESTORE VR to be performed in an execution element (as long as the vector register pair are not being loaded or modified at substantially the same time). In effect, gating means 300 prevents the contents of a vector register pair from being replaced, as a result of the execution of the RESTORE VR instruction, by double words from the save area if the same vector register pair is being loaded or modified (via line 295), and vice versa. The output signal from gating means 300 on output line 298 provides either for the RESTORE VR instruction to be performed or for a load (or modify) instruction to be performed. Of course, if the VIU is zero when the RESTORE VR instruction is fetched and decoded, no output signal will b provided on line 291 indicating that the instruction will not be executed. As a result, the vector register pair will remain unchanged.

At the completion of the execution of the RESTORE VR instruction, the next element address field (in the (even) register pointed to by the instruction) is updated to the save area location of the next pair of vector registers. (The next element number field is set to zero and the pointer to the vector register pair is incremented by two.) At the start of execution of the RESTORE VR instruction, the content of the pointer to the vector register pair must be an even number from zero to fourteen and the content of the next element number field (in the (odd) register pointed to by the instruction) must be less than the section size (the number of element locations in a vector register). Also, whether or not the storage location will be accessed, the starting address of the save area for the current vector register pair must be on a boundary which is a multiple of eight times the section size. Otherwise a specification exception is recognized. (When RESTORE VR is executed, data is gated from a save area in storage to a vector register pair as symbolically indicated by storage 20 and lines 302 and 304.)

Save Area

Programs that save and restore registers of the VPU 12 determine the current section size and create the save area accordingly.

The starting addresses of the save areas for the current and next pair of physical vector registers are determined by the following relationships:

$$SAC = NEA - 8*NEN$$

$$SAN = SAC + 8*Z$$

SAC: starting address of save area for the current vector register pair.
NEA: content of next-element address field.
NEN: content of next-element number field.
SAN: starting address of save area for the next vector register pair.

Since, in a majority of cases, vector instructions will be utilizing vector register pairs, the preceding discussion generally referred to a vector register pair when explaining clear, save and restore operations. However, it is understood that one vector register can be substituted for a vector register pair wherever found in the discussion of the operations involved in program switching. Furthermore, it is understood that more than one vector register pair (or vector register) can be involved in program switching. Each vector register pair (or vector register) has a corresponding vector in-use bit VIU (first register means) and a vector change bit VCH (second register means) such that if more than one vector register pair (or vector register) is involved in program switching, then more than one VIU and/or VCH will be involved in the clear, save and restore operations of program switching. Nevertheless, the preceding discussion simply focused on one vector register pair having associated therewith one VIU and one VCH in order to facilitate the description of the operations involved in program switching.

Although this invention has been shown and described with respect to embodiments thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. In a data processing system including a memory, microcode, at least one central processing unit having an instruction execution means and an instruction pre-processing unit connected to a vector processor which has a vector status register, an extension of said instruction execution means and vector registers containing elements, and programs running in said central processing unit which have vector instructions that operate on said vector registers, the method for reducing the time for switching between programs, comprising the steps of:

setting a change bit by execution of said microcode in response to a signal provided by said instruction pre-processing unit following the execution of one of said vector instructions, in one of said programs, in said instruction pre-processing unit, which changed an element in one of said vector registers corresponding to said change bit, said change bit residing in a first field of said vector status register for indicating that at least one element of said corresponding vector register is changed, and setting a bit in a second field of said vector status register, corresponding to said vector register for indicating that said vector register is in use, interrupting said one of said vector instructions and executing an interruptible privileged one of said vector instructions, in said extension of said instruction execution means which is controlled by said microcode in said vector processor, following said interruption, said execution of said privileged instruction providing for the writing of the elements of said vector register, corresponding to said change bit, into the same area of said memory from which said vector register was previously restored prior to said execution of said privileged instruction, when said change bit corresponding to said vector register is set, thereby saving said vector register only when said vector register is changed thus reducing program switching time, and resetting said change bit corresponding to said vector register without resetting said bit in said second field corresponding to said vector register whose contents were saved by execution of said privileged instruction and saving the contents of said vector status register in said central processing unit, and executing a different one of said programs that accesses said vector register which corresponds to said bit in said second field of said vector status register indicating that said vector register is in-use by said different one of said programs, said change bit in said first field of said vector status register corresponding to said vector register remaining reset indicating that no instruction in said different one of said programs has changed an element in said vector register.

* * * * *